United States Patent [19]
Sato et al.

[11] Patent Number: 4,789,590
[45] Date of Patent: Dec. 6, 1988

[54] ABRASIVE TAPE

[75] Inventors: Masami Sato; Masaaki Fujiyama; Masami Suzuki; Yasuyuki Yamada, all of Kanagawa, Japan

[73] Assignee: Fuji Photo Film Co., Ltd., Kanagawa, Japan

[21] Appl. No.: 172,821

[22] Filed: Mar. 25, 1988

[30] Foreign Application Priority Data

Mar. 25, 1987 [JP] Japan ................... 62-70883

[51] Int. Cl.$^4$ ............... G11B 5/627; G11B 5/78; B32B 5/16
[52] U.S. Cl. ...................... 428/323; 428/328; 428/329; 428/330; 428/331; 428/336; 428/425.9; 428/522; 428/900
[58] Field of Search ........... 428/694, 695, 900, 425.9, 428/522, 323, 328, 329, 330, 331, 413, 336; 427/128, 131

[56] References Cited

U.S. PATENT DOCUMENTS

| 4,047,232 | 9/1977 | Hisagen | 428/900 |
|---|---|---|---|
| 4,275,108 | 6/1981 | Yamaguchi | 428/508 |
| 4,379,800 | 4/1983 | Sato | 428/900 |
| 4,397,911 | 8/1983 | Akashi | 428/900 |
| 4,532,172 | 7/1985 | Fujiyama | 428/900 |
| 4,701,364 | 10/1987 | Miyoshi | 428/900 |
| 4,716,077 | 12/1987 | Okita | 428/695 |

Primary Examiner—Ellis P. Robinson
Attorney, Agent, or Firm—Sughrue, Mion, Zinn, Macpeak & Seas

[57] ABSTRACT

An abrasive tape comprises a flexible substrate, and an abrasive layer overlaid on the flexible substrate by applying an abrasive coating composition prepared by use of abrasive grains and a binder onto the flexible substrate and drying the applied abrasive coating composition. The binder contains a vinyl chloride resin having a —$SO_3M$ group, where M represents Li, Na or K, and an epoxy group, a resin having, at a side chain thereof, at least one polar group selected from the group consisting of
—$SO_3M$, —$OSO_2M$, —$OSO_3M$, —COOM, and

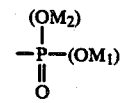

where M represents H, Li, Na or K, $M_1$ represents H, Li, Na, K or an alkyl group, and $M_2$ represents H, Li, Na, K or an alkyl group, and a polyisocyanate.

29 Claims, 1 Drawing Sheet

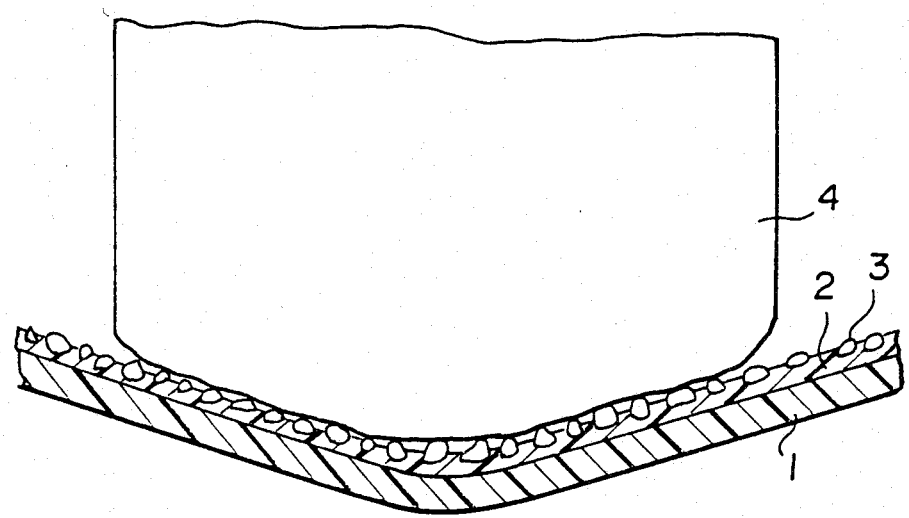

ABRASIVE TAPE

BACKGROUND OF THE INVENTION

1. Field of the Invention

This invention relates to an abrasive tape for use in polishing of a magnetic head for a magnetic recording and reproducing apparatus. This invention particularly relates to an abrasive tape for use in polishing of a magnetic head mainly by being moved between two reels.

2. Description of the Prior Art

Video or high grade audio magnetic heads are required to have very smooth tape sliding surfaces. Therefore, in general, in the process of making the magnetic head, the magnetic head is disposed at a predetermined position after being rough ground, and the tape sliding surface of the magnetic head is polished to a smooth finish by moving an abrasive tape between two reels disposed with the magnetc head intervening therebetween. In general, the abrasive tape comprises a flexible substrate, and a coating film formed on the flexible substrate by applying an abrasive composition containing fine abrasive grains, a binder, and optionally an additive such as a lubricant, which are kneaded together, onto the flexible substrate. Since the abrasive tape is flexible and can therefore snugly fit to the curved surface of the tape sliding surface of the magnetic head, it can polish the surface accurately.

As the abrasive tape, there has heretofore been known, for example, a cleaning tape as disclosed in Japanese Unexamined Patent Publication No. 53(1978)-102017, which comprises a substrate, and a coating film overlaid on the substrate by applying thereonto an abrasive composition containing, for example, abrasive grains consisting of zinc oxide (ZnO), a binder consisting of a vinyl chloride-vinyl acetate copolymer, a polyester polyol or a polyisocyanate, and various additives, for example, a lubricant such as silicone oil, which are kneaded together.

Accordingly, it is considered to replace only the abrasive grains by a substance harder than zinc oxide in the aforesaid cleaning tape and to use the tape thus obtained as an abrasive tape.

However, with the abrasive tape formed by using the vinyl chloride-vinyl acetate copolymer or the polyester polyol as the binder, dispersibility of the abrasive grains by the vinyl chloride resin is low, and the abrasive grains often agglomerate and concentrate locally in the abrasive tape, thereby causing scratching of the polished surface.

On the other hand, in recent years, magnetic heads formed of Permalloy are used widely as, for example, audio magnetic heads. However, Permalloy is a soft and readily corrodible alloy, and therefore the tape sliding surface of the Permalloy magnetic head is readily corroded. With the abrasive tape formed by using the vinyl chloride-vinyl acetate copolymer as the binder, hydrochloric acid is readily released from the binder and corrodes the polished surface contacting the abrasive tape. Therefore, the abrasive tape formed by using the vinyl chloride resin as the binder is not suitable particularly in the case where the material which is to be polished is readily corrodible as in the case of the Permalloy magnetic head.

Also, abrasive tapes are required to exhibit substantially high durability of the abrasive layer. In the case where durability of the abrasive layer is low and the abrasive grains readily separate from the abrasive layer, the abrasive grains accumulate between the abrasive tape and the polished surface, thereby scratching the polished surface.

SUMMARY OF THE INVENTION

The primary object of the present invention is to provide an abrasive tape which exhibits good dispersibility of abrasive grains in the abrasive layer and which does not corrode the polished surface even though the polished material is readily corrodible as in the case of the Permalloy magnetic head.

Another object of the present invention is to provide an abrasive tape which is provided with an abrasive layer exhibiting high durability and is suitable particularly for finish polishing.

The present invention provides an abrasive tape comprising a flexible substrate, and an abrasive layer overlaid on said flexible substrate by applying an abrasive coating composition prepared by use of abrasive grains and a binder onto said flexible substrate and drying the applied abrasive coating composition, wherein the improvement comprises the use of, as said binder:

(i) a vinyl chloride resin having a —SO$_3$M group, where M represents Li, Na or K, and an epoxy group, (ii) a resin having, at a side chain thereof, at least one polar group selected from the group consisting of —SO$_3$M, —OSO$_2$M, —OSO$_3$M, —COOM, and

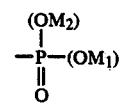

where M represents H, Li, Na or K, M$_1$ represents H, Li, Na, K or an alkyl group, and M$_2$ represents H, Li, Na, K or an alkyl group, and (iii) a polyisocyanate.

As the binder for the abrasive tape in accordance with the present invention, only the aforesaid three kinds of the constituents may be used, or other constituents may also be used in combination with the aforesaid three kinds of the constituents.

The —SO$_3$M group in the vinyl chloride resin imparts good dispersion properties to the vinyl chloride resin and has the effect of uniform dispersion of the abrasive grains in the abrasive layer without local agglomeration and concentration of the abrasive grains in the abrasive layer, thereby preventing scratching of the polished surface.

Also, the epoxy group in the vinyl chloride resin has the effect of prevention of dehydrochlorination of vinyl chloride and elimination of the problem with regard to corrosion of the polished surface of the polished material such as the Permalloy magnetic head caused by dehydrochlorination.

Also, the polar group imparts good dispersion properties to the resin and has the effect of uniform dispersion of the abrasive grains in the abrasive layer without local agglomeration and concentration of the abrasive grains in the abrasive layer, thereby preventing scratching of the polished surface.

The polyisocyanate reacts with the vinyl chloride resin having the —SO$_3$M group and the epoxy group, and the resin having the polar group. The polyisocyanate also reacts with moisture contained in air or the abrasive layer. The polyisocyanate forms a three-dimensional network in the overall binder by such complicated reactions, thereby to tightly hold the abrasive grains in the binder having the three-dimensional network.

With the abrasive tape in accordance with the present invention wherein the resin having the polar group which exhibits a high effect of dispersing the abrasive grains is used as the binder, the abrasive grains can be dispersed substantially, and scratching of the polished surface caused by agglomeration of the abrasive grains can be prevented.

Also, since the vinyl chloride resin having the $-SO_3M$ group which exhibits a high effect of dispersing the abrasive grains is used as the binder, the dispersion effect of the polar group is enhanced by the $-SO_3M$ group, and the dispersion effect as a whole is markedly increased synergistically. As a result, the abrasive grains can be dispersed substantially, and scratching of the polished surface can be prevented reliably.

Also, the vinyl chloride resin has the epoxy group exhibiting a high effect of preventing dehydrochlorination of vinyl chloride, and therefore corrosion of the magnetic head caused by dehydrochlorination can be prevented by the epoxy group.

Also, in the present invention, the polyisocyanate capable of forming the aforesaid three-dimensional network is used as the binder. Therefore, an abrasive layer having high durability and free from separation of the abrasive grains from the abrasive layer can be obtained. As a result, the problem with regard to scratching of the polished surface by abrasive grains separated from the abrasive layer can be eliminated.

Accordingly, with the abrasive tape in accordance with the present invention wherein the three kinds of the constituents are used as the binder, a high effect of dispersing the abrasive grains and high durability of the abrasive layer can be achieved and, as a result, scratching of the polished surface can be prevented. Also, corrosion of the magnetic head can be prevented. These effects can be achieved only when all of the aforesaid three kinds of the constituents are used in combination with one another as the binder.

BRIEF DESCRIPTION OF THE DRAWING

The single drawing is an enlarged sectional view showing an embodiment of the abrasive tape in accordance with the present invention, which is in the use condition for polishing a magnetic head.

DESCRIPTION OF THE PREFERRED EMBODIMENTS

The present invention will hereinbelow be described in further detail with reference to the accompanying drawing.

As shown in the drawing, an embodiment of the abrasive tape in accordance with the present invention comprises a flexible substrate 1, and an abrasive layer 2 overlaid on the substrate 1. The abrasive layer 2 is formed by kneading abrasive grains 3, a binder, and various additives which may be used when necessary, thereby to prepare an abrasive coating composition, applying the abrasive coating composition thus prepared onto the substrate 1, and drying the applied abrasive coating composition.

When the abrasive tape is used for polishing the tape sliding surface of a magnetic head 4 as an example of the material which is to be polished, the abrasive tape is moved at a predetermined speed from one of two reels (not shown) disposed with the magnetic head 4 intervening therebetween to the other thereof. Thus the abrasive layer 2 is made to slide on the magnetic head 4. At this time, the tape sliding surface of the magnetic head 4 is polished smoothly by hard abrasive grains 3 protruding out of the surface of the abrasive layer 2.

As the binder, (i) a vinyl chloride resin having a $-SO_3M$ group where M represents Li, Na or K, and an epoxy group, (ii) a resin having, at a side chain thereof, at least one polar group selected from the group consisting of $-SO_3M$, $-OSO_2M$, $-OSO_3M$, $-COOM$, and

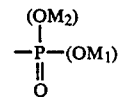

where M represents H, Li, Na or K, $M_1$ represents H, Li, Na, K or an alkyl group, and $M_2$ represents H, Li, Na, K or an alkyl group, and (iii) a polyisocyanate are used.

The vinyl chloride resin is a copolymer of vinyl chloride with a monomer, which is copolymerizable with vinyl chloride, for example, a vinyl ester derivative such as vinyl acetate, vinylidene chloride, acrylonitrile, styrene, or an acrylic ester, and the $-SO_3M$ group and the epoxy group are bonded to the copolymer. The number-average molecular weight of the vinyl chloride resin should preferably be within the range of 15,000 to 60,000. Also, the content of vinyl chloride in the vinyl chloride resin should preferably at least 60 wt. %, and the content of the other constituent copolymerizable with vinyl chloride should preferably be lower than 40 wt. %. The content of vinyl chloride in the vinyl chloride resin should more preferably be within the range of 80 to 90 wt. %, and the content of the other constituent copolymerizable with vinyl chloride should preferably be within the range of 20 to 10 wt. %. The ratio of the $-SO_3M$ group to the vinyl chloride resin should preferably be within the range of 0.1 to 4.0 wt. % in terms of $SO_4$, more preferably within the range of 0.2 to 1.5 wt. % in terms of $SO_4$, and most preferably within the range of 0.5 to 1.0 wt. % in terms of $SO_4$.

The ratio of the epoxy group to the vinyl chloride resin should preferably be within the range of 0.1 to 10 wt. %, more preferably within the range of 0.8 to 8 wt. %, and most preferably within the range of 1.5 to 7 wt. %.

As defined above, M in the $-SO_3M$ group of the vinyl chloride resin is selected from Li, Na and K. Particularly, the $-SO_3M$ group should preferably be the $-SO_3Na$ group since the $-SO_3Na$ group imparts the highest dispersibility of the abrasive grains to the vinyl chloride resin.

In the present invention, the vinyl chloride resin having a $-SO_3M$ group and an epoxy group should preferably be contained in the binder in a ratio of at least 5 wt. % with respect to the total amount of the binder components, should more preferably be contained in the binder in a ratio of at least 10 wt. % with respect to the total amount of the binder components, and should most preferably be contained in the binder in a ratio of at least 15 wt. % with respect to the total amount of the binder components. When the ratio of the vinyl chloride resin having a $-SO_3M$ group and an epoxy group is lower than 5 wt. %, substantial effects cannot be expected.

Also, the amount of the vinyl chloride resin having a —SO₃M group and an epoxy group should preferably be within the range of 5 to 70 parts per 100 parts of the abrasive grains, and should more preferably be within the range of 5 to 50 parts per 100 parts of the abrasive grains.

Also, the aforesaid resin having, at a side chain thereof, at least one polar group selected from the group consisting of —SO₃M, —OSO₂M, —OSO₃M, —COOM, and

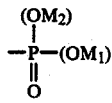

where M represents H, Li, Na or K, M₁ represents H, Li, Na, K or an alkyl group, and M₂ represents H, Li, Na, K or an alkyl group, may be, for example, a polyurethane resin having a —COOM group or a —SO₃M group, a vinyl chloride resin having a —SO₃M group, a —COOM group, a —OSO₃M group or a

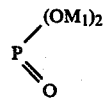

group, or a polyester resin having a —SO₃M group.

These resins are described in, for example, Japanese Unexamined Patent Publication Nos. 59(1984)-8127, 57(1982)-92422, 57(1982)-92423 and 59(1984)-40320.

Examples of the resin containing the polar group are a polyurethane containing a —COOH group (TIM-3005 supplied by Sanyo Kasei K.K.), a polyurethane containing a —SO₃Na group (UR-8300 supplied by Toyobo Co., Ltd.), a vinyl chloride-vinyl acetate copolymer containing a —COOH group (400x 110A supplied by Nippon Zeon Co., Ltd.), and a polyester containing a —SO₃Na group (VYRON supplied by Toyobo Co., Ltd.). The amount of the hydrophilic group should preferably be within the range of 1 equivalent/10⁶ gr to 10,000 equivalents/10⁶ gr. Also, the molecular weight should preferably be within the range of 10,000 to 200,000.

In the present invention, the aforesaid resin having, at a side chain thereof, at least one polar group selected from the group consisting of —SO₃M, —OSO₂M, —OSO₃M, —COOM, and

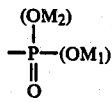

where M represents H, Li, Na or K, M₁ represents H, Li, Na, K or an alkyl group, and M₂ represents H, Li, Na, K or an alkyl group, should preferably be contained in the binder in a ratio of at least 5 wt. % with respect to the total amount of the binder components, should more preferably be contained in the binder in a ratio of at least 10 wt. % with respect to the total amount of the binder components, and should most preferably be contained in the binder in a ratio of at least 15 wt. % with respect to the total amount of the binder components. When the ratio of said resin having a polar group is lower than 5 wt. %, substantial effects cannot be expected.

Also, the amount of the aforesaid resin having, at a side chain thereof, at least one polar group selected from the group consisting of —SO₃M, —OSO₂M, —OSO₃M, —COOM, and

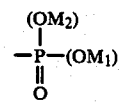

where M represents H, Li, Na or K, M₁ represents H, Li, Na, K or an alkyl group, and M₂ represents H, Li, Na, K or an alkyl group, should preferably be within the range of 1 to 50 parts per 100 parts of the abrasive grains, and should more preferably be within the range of 1 to 30 parts per 100 parts of the abrasive grains.

The aforesaid polyisocanate is a low molecular polyisocyanate having a plurality of isocyanate groups and having a molecular weight within the range of 150 to 2,000. By the addition of the low molecular polyisocyanate, a three-dimensional network structure can be formed in the abrasive layer, thereby to improve the physical strength of the abrasive layer. As a result, durability of the abrasive layer can be improved, and scratching of the polishedsurface can be minimized. The ratio of the low molecular polyisocyanate added should preferably be within the range of 10 to 70 wt. % with respect to the total amount of the binder components, and should more preferably be within the range of 15 to 50 wt. % with respect to the total amount of the binder components from the viewpoint of the reinforcing effects and the pot life of the abrasive coating composition.

The term "low molecular polyisocyanate" as used herein embraces an isocyanate monomer having a plurality of isocyanate groups, a polymer of such an isocyanate monomer, and an adduct of the isocyanate monomer or the isocyanate polymer with a compound such as a polyhydric alcohol. The isocyanate monomer may be, for example, ethane diisocyanate, 2,2,4-trimethylpentane diisocyanate, ω,ω'-diisocyanate-1,3-dimethylbenzole, ω,ω'-diisocyanate-1,2-dimethylcyclohexane diisocyanate, naphthalene-1,4-diisocyanate, or triphenylmethane-4,4',4"-triisocyanate.

Also, polymers different from the aforesaid three kinds of the binder components may be added to the binder in such a ratio that the effects of the binder are not adversely affected. Such polymers may be, for example, rubber type polymers such as an acrylonitrile-butadiene copolymer and a styrene-butadiene copolymer, cellulose derivatives such as cellulose nitrate and cellulose acetate, and polyurethane.

Also, in the present invention, additives such as a lubricant and an antistatic agent may be added to the abrasive coating composition.

The abrasive grains should preferably have a Mohs hardness of at least 6 and should preferably be harder than those used in the conventional cleaning tape. The abrasive grains should more preferably have a Mohs hardness of at least 8.

As the abrasive grains having a high Mohs hardness, chromic oxide (Cr₂O₃, Mohs hardness: 8.5), aluminum oxide (αO₂O₃, Mohs hardness: 9), silicon carbide (α-SiC, Mohs hardness: 9.5) or the like may be used, among which chromic oxide exhibits moderate hardness, good abrasive effects, and little risk of scratching of the polished surface, and thus is suitable for finish polishing.

The grain sizes of the abrasive grains should preferably be within the range of approximately 16 μm to 0.1 μm. Particularly, for regular finishing wherein high polishing accuracy is required, the grain sizes should preferably be within the range of approximately 1 μm to 0.1 μm.

The thickness of the abrasive layer 2 formed of the abrasive coating composition essentially consisting of the aforesaid abrasive grains, the binder and the additives should preferably be not larger than 50 μm, more preferably within the range of 2 μm to 10 μm, depending on the shape and material of the magnetic head in the case where the material which is to be polished is the magnetic head. When the thickness of the abrasive layer 2 is too thick, the contacting condition of the abrasive tape with the magnetic head is deteriorated.

The flexible substrate 1 may be formed of polyethylene terephthalate (PET), polyethylene-2,6-naphthalate or the like.

The present invention will further be illustrated by the following non-limitative examples.

EXAMPLE 1

An abrasive tape was made by applying an abrasive coating composition as shown below to a thickness of 5 μm onto a 12 μm-thick polyethylene terephthalate (PET) substrate and drying the applied abrasive coating composition. The parts in the following descriptions are part by weight (weight of solid contents).

| Abrasive coating composition: | |
|---|---|
| $Cr_2O_3$ | 300 parts |
| (granular, size: 0.3μ, Mohs hardness: 8.5) | |
| Vinyl chloride resin | 9.6 parts |
| (Vinyl chloride: 87 wt %, number-average molecular weight: $2.6 \times 10^4$, epoxy group content: 3.5 wt %, sodium sulfonate group content: 0.5 wt %, where wt % is a value with respect to the weight of the vinyl chloride resin) | |
| Sulfonic acid group-containing polyurethane resin | 4.8 parts |
| (molecular weight: 25,000, molecular weight per —$SO_3H$: 25,000) | |
| Polyisocyanate | 12.8 parts |
| (75 wt % ethyl acetate solution of a reaction product of 3 mols of 2,4-tolylene diisocyanate compound with 1 mol of trimethylolpropane) | |
| Oleic acid | 1.5 parts |
| Stearic acid | 1.5 parts |
| Butyl stearate | 5 parts |
| Lecithin | 2 parts |
| Methyl ethyl ketone | 100 parts |
| Cyclohexanone | 100 parts |

COMPARATIVE EXAMPLE 1

As a comparative example, an abrasive tape was made by applying the abrasive coating composition as shown below onto a substrate approximately similar to that used in Example 1 and drying the applied abrasive coating composition. The sample obtained by Comparative Example 1 is the same as Sample No. 24 disclosed in Japanese Unexamined Patent Publication No. 53(1978)-102017.

| Abrasive coating composition: | |
|---|---|
| ZnO | 300 parts |
| (size: 120 μm diameter, Mohs hardness: 4.5) | |

-continued

| | |
|---|---|
| Vinyl chloride-vinyl acetate copolymer | 34.7 parts |
| (copolymerization ratio: 87:13, polymerization degree: 350) | |
| Polyester polyol | 21 parts |
| (reaction product of 1 mol of adipic acid, 1 mol of diethylene glycol, with 0.06 mol of trimethylolpropane; viscosity at 75° C.: 1,000 CP, specific gravity: 1.18, OH value: 60, acid value: <2) | |
| Soybean lecithin | 2.4 parts |
| Silicone oil (dimethyl polysiloxane) | 0.1 part |
| Polyisocyanate | 18 parts |
| (75 wt. % ethyl acetate solution of a reaction product of 3 mols of 2,4-tolylene diisocyanate compound with 1 mol of trimethylolpropane) | |
| Methyl ethyl ketone | 400 parts |
| Toluene | 400 parts |

COMPARATIVE EXAMPLE 2

An abrasive tape was made in the same manner as Example 1, except that an abrasive coating composition obtained by omitting the sulfonic acid group-containing polyurethane resin (4.8 parts) from the abrasive coating composition for the abrasive tape in Example 1, i.e. by adjusting the amount of the sulfonate group-containing polyurethane resin to be 0 part in the abrasive coating composition for the abrasive tape in Example 1, was used.

COMPARATIVE EXAMPLE 3

An abrasive tape was made in the same manner as Example 1, except that an abrasive coating composition obtained by omitting the vinyl chloride resin (9.6 parts) from the abrasive coating composition for the abrasive tape in Example 1, i.e. by adjusting the amount of the vinyl chloride resin to be 0 part in the abrasive coating composition for the abrasive tape in Example 1, was used.

COMPARATIVE EXAMPLE 4

An abrasive tape was made in the same manner as Example 1, except that an abrasive coating composition obtained by omitting the polyisocyanate (12.8 parts) from the abrasive coating composition for the abrasive tape in Example 1, i.e. by adjusting the amount of the vinyl chloride resin to be 0 part in the abrasive coating composition for the abrasive tape in Example 1, was used.

For the abrasive tapes of Example 1, and Comparative Examples 1, 2, 3 and 4, conditions of scratches on the head surfaces after polishing of the ferrite video heads were investigated. Also, corrosion characteristics of the abrasive tapes were investigated by contacting the abrasive tapes with Permalloy audio heads and observing the conditions of corrosion on the head surfaces. The results were as shown in Table 1.

TABLE 1

| | Scratches on head surface | | Corrosion of |
|---|---|---|---|
| | Scratches/0.5 mm | Evaluation | head |
| Example 1 | 0 | o | None |
| Comp. Ex. 1 | 50< | xx | Corroded |
| Comp. Ex. 2 | 8 | Δ | None |
| Comp. Ex. 3 | 20 | Δ | Corroded |
| Comp. Ex. 4 | 29 | xx | None |

In Table 1, scratches on the head surfaces were investigated by observing the surfaces of the ferrite video heads, which had been polished for one minute with the respective abrasive tapes, by use of a microscope and counting scratches having a width of at least 2 μm. The results of evaluation with respect to scratching are expressed by symbols o, Δ and x in Table 1. Corrosion of the heads was investigated by contacting each abrasive tape with each Permalloy audio head for three days at 60° C. and 80% RH, and then observing the surface of the head.

As is clear from Table 1, with the abrasive tape of Example 1 in accordance with the present invention, scratches on the head surface are decreased markedly and corrosion on the head surface is prevented substantially as compared with the abrasive tapes of Comparative Examples 1 to 4.

Specifically, the $-SO_3M$ group has the effects on improvement of the dispersibility of the abrasive grains and uniform dispersion of the abrasive grains in the abrasive layer, thereby to prevent scratching on the polished surface. The epoxy group has the effects on prevention of dehydrochlorination, and consequently prevents corrosion of the polished surface caused by dehydrochlorination, particularly corrosion of the polished surface of readily corrodible material such as Permalloy. Also, the sulfonic acid group contained in the sulfonic acid group-containing polyurethane contributes to the dispersion of the abrasive grains. As a result, the sulfonic acid group-containing polyurethane uniformly disperses the abrasive grains in the abrasive layer, thereby to make smooth the surface of the abrasive layer, and prevents scratching of the polished surface. Further, the polyisocyanate acts as a curing agent, forms a three-dimensional network in the binder, and therefore prevents separation of the abrasive grains from the abrasive layer. Accordingly, it is possible to prevent the problem that abrasive grains separated from the abrasive layer intervene between the abrasive layer and the polished surface and scratch the surface.

It should be understood that the present invention may be modified in various manners and is not limited to the aforesaid embodiments. Also, the abrasive tape in accordance with the present invention is not limited to the elongated tape as in the aforesaid embodiments, and embraces a disk-shaped tape comprising a thin circular substrate and an abrasive layer overlaid on the thin circular substrate.

We claim:

1. An abrasive tape comprising a flexible substrate, and an abrasive layer overlaid on said flexible substrate by applying an abrasive coating composition prepared by use of abrasive grains and a binder onto said flexible substrate and drying the applied abrasive coating composition, wherein the improvement comprises the use of, as said binder:

(i) a vinyl chloride resin having a $-SO_3M$ group, where M represents Li, Na or K, and an epoxy group, (ii) a resin having, at a side chain thereof, at least one polar group selected from the group consisting of $-SO_3M$, $-OSO_2M$, $-OSO_3M$, $-COOM$, and

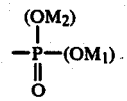

where M represents H, Li, Na or K, $M_1$ represents H, Li, Na, K or an alkyl group, and $M_2$ represents H, Li, Na, K or an alkyl group, and (iii) a polyisocyanate.

2. An abrasive tape as defined in claim 1 wherein said vinyl chloride resin has a number-average molecular weight within the range of 15,000 to 60,000.

3. An abrasive tape as defined in claim 1 wherein the content of vinyl chloride in said vinyl chloride resin is at least 60 wt. %, and the content of other constituents copolymerizable with vinyl chloride in said vinyl chloride resin is lower than 40 wt. %.

4. An abrasive tape as defined in claim 3 wherein the content of vinyl chloride in said vinyl chloride resin is within the range of 80 to 90 wt. %, and the content of other constituents copolymerizable with vinyl chloride in said vinyl chloride resin is within the range of 20 to 10 wt. %.

5. An abrasive tape as defined in claim 1 wherein the ratio of said $-SO_3M$ group, which is contained in said vinyl chloride resin, to said vinyl chloride resin is within the range of 0.1 to 4.0 wt. % in terms of $SO_4$.

6. An abrasive tape as defined in claim 5 wherein the ratio of said $-SO_3M$ group to said vinyl chloride resin is within the range of 0.2 to 1.5 wt. % in terms of $SO_4$.

7. An abrasive tape as defined in claim 6 wherein the ratio of said $-SO_3M$ group to said vinyl chloride resin is within the range of 0.5 to 1.0 wt. % in terms of $SO_4$.

8. An abrasive tape as defined in claim 1 wherein the ratio of said epoxy group to said vinyl chloride resin is within the range of 0.1 to 10 wt. %.

9. An abrasive tape as defined in claim 8 wherein the ratio of said epoxy group to said vinyl chloride resin is within the range of 0.8 to 8 wt. %.

10. An abrasive tape as defined in claim 9 wherein the ratio of said epoxy group to said vinyl chloride resin is within the range of 1.5 to 7 wt. %.

11. An abrasive tape as defined in claim 1 wherein said vinyl chloride resin is contained in said binder in a ratio of at least 5 wt. % with respect to the total amount of binder components.

12. An abrasive tape as defined in claim 11 wherein said vinyl chloride resin is contained in said binder in a ratio of at least 10 wt. % with respect to the total amount of binder components.

13. An abrasive tape as defined in claim 12 wherein said vinyl chloride resin is contained in said binder in a ratio of at least 15 wt. % with respect to the total amount of binder components.

14. An abrasive tape as defined in claim 1 wherein the amount of said vinyl chloride resin used is within the range of 5 to 70 parts per 100 parts of said abrasive grains.

15. An abrasive tape as defined in claim 14 wherein the amount of said vinyl chloride resin used is within the range of 5 to 50 parts per 100 parts of the abrasive grains.

16. An abrasive tape as defined in claim 1 wherein said resin having said polar group contains a hydrophilic group in an amount within the range of 1 equivalent/$10^6$ gr to 10,000 equivalents/$10^6$ gr.

17. An abrasive tape as defined in claim 1 wherein said resin having said polar group has a molecular weight within the range of 10,000 to 200,000.

18. An abrasive tape as defined in claim 1 wherein said resin having said polar group is contained in said binder in a ratio of at least 5 wt. % with respect to the total amount of binder components.

19. An abrasive tape as defined in claim 18 wherein said resin having said polar group is contained in said binder in a ratio of at least 10 wt. % with respect to the total amount of binder components.

20. An abrasive tape as defined in claim 19 wherein said resin having said polar group is contained in said binder in a ratio of at least 15 wt. % with respect to the total amount of binder components.

21. An abrasive tape as defined in claim 1 wherein the amount of said resin having said polar group used is within the range of 1 to 50 parts per 100 parts of said abrasive grains.

22. An abrasive tape as defined in claim 21 wherein the amount of said resin having said polar group used is within the range of 1 to 30 parts per 100 parts of the abrasive grains.

23. An abrasive tape as defined in claim 1 wherein said polyisocyanate is a low molecular polyisocyanate having a plurality of isocyanate groups and having a molecular weight within the range of 150 to 2,000.

24. An abrasive tape as defined in claim 23 wherein the ratio of said low molecular polyisocyanate added is within the range of 10 to 70 wt. % with respect to the total amount of binder components.

25. An abrasive tape as defined in claim 24 wherein the ratio of said low molecular polyisocyanate added is within the range of 15 to 50 wt. % with respect to the total amount of binder components.

26. An abrasive tape as defined in claim 1 wherein said abrasive grains have a Mohs hardness of at least 6.

27. An abrasive tape as defined in claim 26 wherein said abrasive grains have a Mohs hardness of at least 8.

28. An abrasive tape as defined in claim 1 wherein the grain sizes of said abrasive grains are within the range of approximately 16 $\mu$m to 0.1 $\mu$m.

29. An abrasive tape as defined in claim 1 wherein the thickness of said abrasive layer is not larger than 50 $\mu$m.

* * * * *